United States Patent
Song et al.

(10) Patent No.: US 11,947,029 B2
(45) Date of Patent: Apr. 2, 2024

(54) SYSTEM AND METHOD FOR DETECTING OCCUPANTS

(71) Applicant: KOREA INSTITUTE OF ENERGY RESEARCH, Daejeon (KR)

(72) Inventors: Yu Jin Song, Daejeon (KR); Yoon Dong Sung, Daejeon (KR); Kuk Yeol Bae, Daejeon (KR); Gi Hwan Yoon, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 50 days.

(21) Appl. No.: 17/513,466

(22) Filed: Oct. 28, 2021

(65) Prior Publication Data

US 2023/0135195 A1    May 4, 2023

(51) Int. Cl.
| | |
|---|---|
| *G01S 1/00* | (2006.01) |
| *G01S 1/04* | (2006.01) |
| *G01S 5/02* | (2010.01) |
| *G01S 1/08* | (2006.01) |

(52) U.S. Cl.
CPC ............ *G01S 5/0269* (2020.05); *G01S 1/045* (2013.01); *G01S 1/08* (2013.01); *G01S 5/0268* (2013.01)

(58) Field of Classification Search
CPC ...... G01S 5/0269; G01S 5/0268; G01S 1/045; G01S 1/08; G01S 1/00; G01S 2201/00; G01S 2201/01; G01S 2201/02; G01S 2201/025
USPC ......................................... 342/385, 386, 417
See application file for complete search history.

(56) References Cited

U.S. PATENT DOCUMENTS

| | | | |
|---|---|---|---|
| 8,138,974 B2 | 3/2012 | Hido et al. | |
| 10,111,069 B1 * | 10/2018 | Dawson-Haggerty ...................... H04W 4/80 |
| 10,341,816 B2 | 7/2019 | Koo | |
| 10,620,296 B1 * | 4/2020 | Ezal | G01S 1/14 |
| 10,631,123 B2 * | 4/2020 | O'Keeffe | H04W 4/80 |
| 11,277,893 B2 * | 3/2022 | Sinha | H05B 45/12 |
| 2014/0107846 A1 * | 4/2014 | Li | H04W 4/33 700/275 |
| 2015/0160328 A1 | 6/2015 | Peinhardt et al. | |
| 2016/0260301 A1 | 9/2016 | Miller et al. | |
| 2019/0320081 A1 | 10/2019 | Salandy-Defour et al. | |
| 2021/0325839 A1 * | 10/2021 | Hu | G06Q 10/06 |

(Continued)

FOREIGN PATENT DOCUMENTS

| | | | | |
|---|---|---|---|---|
| CA | 3146559 A1 * | 1/2021 | ............. | F24F 11/49 |
| JP | 6168527 B2 | 7/2017 | | |

(Continued)

OTHER PUBLICATIONS

Hwang et al., "A Stable Access Point Selection Method Considering RSSI Variation in Fingerprinting for Indoor Positioning", KIPS Tr. Comp. and Comm. Sys., 2017, vol. 6, No. 9, pp. 369-376.

(Continued)

*Primary Examiner* — Chuong P Nguyen
(74) *Attorney, Agent, or Firm* — Birch, Stewart, Kolasch & Birch, LLP

(57) ABSTRACT

The present disclosure relates to a system and method for detecting occupants, and more specifically, to a system and method for accurately detecting positions of occupants in a building using beacon signals.

11 Claims, 6 Drawing Sheets

(56) References Cited

U.S. PATENT DOCUMENTS

2023/0003828 A1* 1/2023 Miyake .................... G01S 5/14

FOREIGN PATENT DOCUMENTS

| KR | 10-2014-0120134 A | 10/2014 |
| KR | 10-2018-0095958 A | 8/2018 |

OTHER PUBLICATIONS

Korean Office Action for application No. 10-2020-0086954 dated Sep. 27, 2021.

* cited by examiner

SYSTEM AND METHOD FOR DETECTING OCCUPANTS

BACKGROUND OF THE DISCLOSURE

Field of the Disclosure

The present disclosure relates to a system and method for detecting occupants.

Related Art

With the development of information and communication technologies, technologies for building automatic control systems based on information and communication technologies such as smart homes, smart buildings, and home IOTs (Internet of Things) are also being developed.

A building automatic control system refers to a system that monitors and controls heating and cooling equipment, electrical equipment, communication equipment, crime prevention equipment, disaster prevention equipment, and air conditioning equipment in a building in batches in a central control center.

The building automatic control system can supply heating and cooling energy and lighting power only to spaces where occupants are located in a building after checking locations of the occupants through various sensors, and cut off the heating and cooling energy and lighting power in the rest of the space, and thus, the energy consumption of the building can be significantly reduced.

In addition, the building automatic control system can provide a comfortable living environment for occupants because the heating and cooling temperature and air quality in a building can be automatically adjusted depending on a number of occupants after the number of occupants is checked through various sensors. Herein, the occupant means a person located in a building.

As such, in the building automatic control system, it is important to check the location or number of occupants.

A method of checking a location or number of occupants in the building automatic control system includes an infrared sensor method, a camera photographing method, and a beacon communication method.

Among the above methods, the beacon communication method is a method of calculating a location of occupants by receiving a beacon signal transmitted from a plurality of beacon devices installed in a building at a communication terminal (for example, a smartphone) carried by the occupants.

Conventionally, in the beacon communication method, the location of occupants was calculated using only signal strengths of a beacon signal and a beacon ID.

Although it is ideal that the signal strength of the beacon signal changes linearly depending on a distance, in reality, signal distortion or reflection occurs due to objects such as bulkheads within a building, so that the signal strength changes irregularly regardless of distance.

To this end, the accuracy of occupant location calculation, that is, occupant detection, is also degraded.

Spaces within a building are partitioned by bulkheads, and a typical building automatic control system controls heating and cooling, and lighting for each space partitioned by the bulkheads.

Accordingly, the building automatic control system, to which the conventional beacon communication method having the aforementioned problem is applied, could misjudge a wrong space as the space where occupants are located, not the space where the occupants are actually located. Thereby, the heating and cooling energy and lighting power can be supplied to the wrong space.

SUMMARY OF THE DISCLOSURE

In this background, in an aspect, the present disclosure provides a system and method for accurately detecting a location of occupants in a building using a beacon signal.

In one embodiment, there is provided a system for detecting occupants, the system comprising: a first beacon, which is installed in a first space partitioned by a bulkhead in a building, to transmit a 1-1 signal at a first transmission strength, and then, to transmit a 1-2 signal at a second transmission strength; a second beacon, which is installed to be spaced apart from the first beacon by a predetermined distance in the first space, to transmit a 2-1 signal at the first transmission strength, and then, to transmit a 2-2 signal at the second transmission strength; a repeater which receives and transmits 1-1 reception strength information of the 1-1 signal, 1-2 reception strength information of the 1-2 signal, 2-1 reception strength information of the 2-1 signal, and 2-2 reception strength information of the 2-2 signal from a communication terminal receiving signals transmitted from the first beacon and the second beacon; and a device for detecting occupants which calculates a first vector using the 1-1 reception strength information and the 2-1 reception strength information received from the repeater, calculates a second vector using the 1-2 reception strength information and the 2-2 reception strength information received from the repeater, and estimates whether the communication terminal is located in the first space according to cosine similarity for the first vector and the second vector.

After receiving the 1-1 reception strength information, the 2-1 reception strength information, the 1-2 reception strength information, and the 2-2 reception strength information multiple times for a preset time, the device for detecting occupants may calculate the first vector by using a representative value for multiple pieces of 1-1 reception strength information and a representative value for multiple pieces of 2-1 reception strength information, and calculate the second vector by using a representative value for multiple pieces of 1-2 reception strength information and a representative value for multiple pieces of 2-2 reception strength information.

The device for detecting occupants may increase the number of occupants in the first space by 1 after estimating that the communication terminal is located in the first space when the cosine similarity is greater than or equal to a preset reference value.

The device for detecting occupants may maintain the number of occupants in the first space as an existing number of occupants after estimating that the communication terminal is located in a space other than the first space when the cosine similarity is less than a preset reference value.

The device for detecting occupants estimates that the communication terminal is located in the first space when the cosine similarity is greater than or equal to a preset reference value, and then, compares a first multiplication value calculated by multiplying the representative value for the multiple pieces of 1-1 reception strength information and the representative value for the multiple pieces of 1-2 reception strength information with a second multiplication value calculated by multiplying the representative value for the multiple pieces of 2-1 reception strength information and the representative value for the multiple pieces of 2-2 reception strength information to estimate a beacon adjacent to the communication terminal.

When the first multiplication value is greater than the second multiplication value and a difference between the two values is greater than or equal to a predetermined reference, the device for detecting occupants may estimate that the communication terminal is adjacent to the first beacon, and then, increase the number of occupants in the vicinity of the first beacon in the first space by 1.

The device for detecting occupants may adjust at least one condition among a wind speed, a wind direction, a temperature, and a humidity of an air conditioning device installed in the vicinity of the first beacon in the first space according to the number of occupants in the vicinity of the first beacon.

The device for detecting occupants may adjust illuminance of a lighting device installed in the vicinity of the first beacon in the first space according to the number of occupants in the vicinity of the first beacon.

In another embodiment, there is provided a method for detecting occupants in a system for detecting occupants, the system including a first beacon, a second beacon, and a device for detecting occupants, wherein the method comprises: a first transmission operation of transmitting a 1-1 signal and a 2-1 signal, having a first transmission strength, respectively from the first beacon and the second beacon, which are installed in a first space partitioned by a bulkhead in a building; a second transmission operation of transmitting a 1-2 signal and a 2-2 signal, having a second transmission strength, respectively from the first beacon and the second beacon; a vector calculation operation in which when 1-1 reception strength information for the 1-1 signal, 1-2 reception strength information for the 1-2 signal, 2-1 reception strength information for the 2-1 signal, and 2-2 reception strength information for the 2-2 signal are measured in a communication terminal receiving signals from the first beacon and the second beacon, the device for detecting occupants calculates a first vector using the 1-1 reception strength information and the 2-1 reception strength information corresponding to the first transmission strength, and calculates a second vector using the 1-2 reception strength information and the 2-2 reception strength information corresponding to the second transmission strength; and an occupant detection operation in which the device for detecting occupants calculates cosine similarity for the first vector and the second vector, and then, calculates the number of occupants by comparing the cosine similarity with a preset reference value.

In the vector calculation operation, the system for detecting occupants further includes a repeater installed in the first space, wherein the repeater may receive the 1-1 reception strength information, the 1-2 reception strength information, the 2-1 reception strength information, and the 2-2 reception strength information from the communication terminal and transmit the same to the device for detecting occupants.

In the occupant detection operation, the device for detecting occupants may increase the number of occupants in the first space by 1 when the cosine similarity is greater than or equal to the reference value.

After the occupant detection operation, the method may further comprise an air conditioning control operation in which the device for detecting occupants adjusts at least one condition among a wind speed, a wind direction, a temperature, and a humidity of an air conditioning device installed in the first space according to the number of occupants in the first space.

After the occupant detection operation, the method may further comprise a lighting control operation in which the device for detecting occupants adjusts illuminance of a lighting device installed in the first space according to the number of occupants in the first space.

In another embodiment, there is provided a system for detecting occupants, wherein the system comprises: a first beacon, which is installed in a first space partitioned by a bulkhead in a building, to transmit a 1-1 signal at a first transmission strength, and then, to transmit a 1-2 signal at a second transmission strength; a second beacon, which is installed to be spaced apart from the first beacon by a predetermined distance in the first space, to transmit a 2-1 signal at the first transmission strength, and then, to transmit a 2-2 signal at the second transmission strength; and a device for detecting occupants which receives 1-1 reception strength information of the 1-1 signal, 1-2 reception strength information of the 1-2 signal, 2-1 reception strength information of the 2-1 signal, and 2-2 reception strength information of the 2-2 signal from a communication terminal receiving signals transmitted from the first beacon and the second beacon, calculates a first vector using the 1-1 reception strength information and the 2-1 reception strength information, calculates a second vector using the 1-2 reception strength information and the 2-2 reception strength information, and estimates whether the communication terminal is located in the first space according to cosine similarity for the first vector and the second vector.

As described above, according to this embodiment, the system for detecting occupants calculates vectors for each signal strength for beacon signals having different signal strengths and detects a number of occupants according to cosine similarity between the vectors, and it is possible to improve the accuracy of occupant detection compared to the conventional method of detecting a number of occupants using only signal strengths of beacon signals.

DESCRIPTION OF EXEMPLARY EMBODIMENTS

Figure 1:
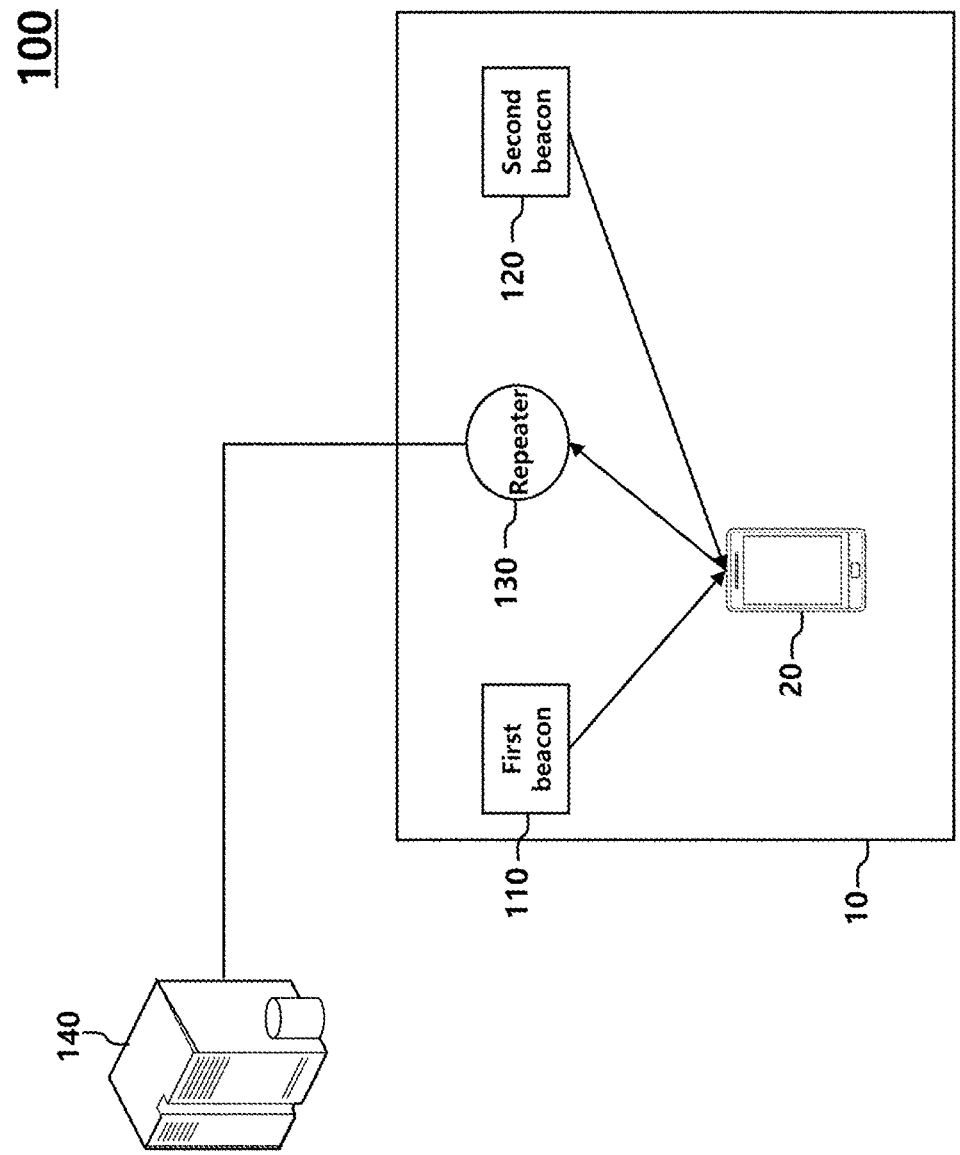
FIG. 1 is a diagram of a system for detecting occupants according to one embodiment.

Hereinafter, some embodiments of the present disclosure will be described in detail with reference to exemplary drawings. It is to be noted that in assigning reference numerals to respective elements in the drawings, the same reference numerals designate the same elements although the elements are shown in different drawings. Furthermore, in describing the present disclosure, a detailed description of the related known functions and constructions will be omitted if it is deemed to make the gist of the present disclosure vague.

Furthermore, in describing the elements of the present disclosure, terms, such as the first, second, A, B, a, and b, may be used. However, the terms are used to only distinguish one element from the other element, but the essence, order, and sequence of the elements are not limited by the terms. Furthermore, in the case in which one element is described to be "connected", "coupled," or "jointed" to the other element, the one element may be directly connected or coupled to the other element, but it should be understood that a third element may be "connected", "coupled," or "jointed" between the two elements.

FIG. 1 is a diagram of a system for detecting occupants according to one embodiment.

Referring to FIG. 1, a system 100 for detecting occupants may include a first beacon 110, a second beacon 120, a repeater 130, and a device 140 for detecting occupants.

The first beacon 110 is installed in a first space 10 partitioned by a bulkhead in a building. Here, the first space 10 may be a work space, a lecture space, a residential space, and the like. FIG. 1 shows the first space 10 in a rectangular shape for convenience of explanation, but the first space 10 may also be formed in various shapes other than the rectangular shape.

In one embodiment, the first beacon 110 may alternately transmit beacon signals having different transmission strengths.

In other words, the first beacon 110 may repeat the operation of transmitting a 1-1 signal, which is a beacon signal, at a first transmission strength, and then a 1-2 signal, which is a beacon signal, at a second transmission strength.

For example, the first beacon 110 may transmit a 1-1 signal with a transmission strength of 3 dbm, and then transmit a 1-2 signal with a transmission strength of −18 dbm. Here, the frequencies of the 1-1 signal and the 1-2 signal may be a constant frequency (for example, 10 Hz).

Here, the beacon signal may be a Bluetooth protocol-based signal, and the first beacon 110 may broadcast a 1-1 signal and a 1-2 signal. In addition, the 1-1 signal and the 1-2 signal may include a first beacon IDentity (ID), which is identification information of the first beacon 110.

The second beacon 120 may be installed to be spaced apart from the first beacon 110 by a predetermined distance in the first space 10.

In one embodiment, the second beacon 120 may also alternately transmit beacon signals having different transmission strengths.

In other words, the second beacon 120 may repeat the operation of transmitting a 2-1 signal, which is a beacon signal, at a first transmission strength, and then a 2-2 signal, which is a beacon signal, at a second transmission strength. Here, the frequencies of the 2-1 signal and the 2-2 signal may also be a constant frequency (for example, 10 Hz), and the 2-1 signal and the 2-2 signal may include a second beacon ID, which is identification information of the second beacon 120. In addition, the second beacon 120 may broadcast the 2-1 signal and the 2-2 signal in the same manner as the first beacon 110.

In one embodiment, a timing point at which the first beacon 110 transmits a 1-1 signal and a timing point at which the second beacon 120 transmits a 2-1 signal may be the same. In addition, a timing point at which the first beacon 110 transmits a 1-2 signal and a timing point at which the second beacon 120 transmits a 2-2 signal may also be the same.

As described above, the 1-1 signal and the 1-2 signal transmitted from the first beacon 110 and the 2-1 signal and the 2-2 signal transmitted from the second beacon 120 may be propagated into the first space 10, and may also be propagated to the outside of the first space 10 after passing through a bulkhead partitioning the first space 10.

The first repeater 130 may be installed in the first space 10, and may perform short-range wireless communication with a first communication terminal 20. Here, the short-range wireless communication may be Bluetooth communication, Wi-Fi direct communication, or Wi-Fi communication.

In one embodiment, the first communication terminal 20 may be a mobile communication terminal located within a signal traveling distance of the first beacon 110 and the second beacon 120. In addition, a dedicated application program for performing communication with a beacon and a repeater may be installed in the first communication terminal 20.

Thus, the first communication terminal 20 may receive a 1-1 signal from the first beacon 110 and receive a 2-1 signal from the second beacon 120. In addition, the reception strength of the 1-1 signal and the reception strength of the 2-1 signal may be measured.

Thereafter, the first communication terminal 20 may receive a 1-2 signal from the first beacon 110 and receive a 2-2 signal from the second beacon 120. In addition, the reception strength of the 1-2 signal and the reception strength of the 2-2 signal may be measured.

As described above, the first communication terminal 20 measuring the reception strength of the received signals may transmit the reception strength information of the received signals to the first repeater 130 through short-range wireless communication with the first repeater 130. In other words, the first communication terminal 20 may transmit 1-1 reception strength information, 1-2 reception strength information, 2-1 reception strength information, and 2-1 reception strength information, which are the reception strength information of a 1-1 signal, a 1-2 signal, a 2-1 signal, and a 2-2 signal, to the first repeater 130.

Here, the first communication terminal 20 may transmit 1-1 reception strength information and 2-1 reception strength information to the first repeater 130, and then transmit 1-2 reception strength information and 2-2 reception strength information to the first repeater 130.

In addition, the first communication terminal 20 may transmit 1-1 reception strength information, 2-1 reception strength information, 1-2 reception strength information, and 2-2 reception strength information in batches to the first repeater 130.

When transmitting the reception strength information to the first repeater 130, the first communication terminal 20 may also transmit the first beacon ID and the second beacon ID.

While the first communication terminal 20 is located within a signal traveling distance of the first beacon 110 and the second beacon 120, the above operation may be periodically repeated.

The first repeater 130 may receive 1-1 reception strength information, 2-1 reception strength information, 1-2 reception strength information, and 2-2 reception strength information through short-range wireless communication with the first communication terminal 20, and may also receive the first beacon ID and the second beacon ID.

The first repeater 130 may pre-store the first beacon ID and the second beacon ID. In addition, the first beacon ID and the second beacon ID may be recognized by comparing the pre-stored first beacon ID and the second beacon ID with the first beacon ID and the second beacon ID received from the first communication terminal 20. Thus, the first repeater 130 may identify that the reception strength information received from the first communication terminal 20 is reception strength information for the signals of the first beacon 110 and the second beacon 120 installed in the first space 10.

In this case, the first repeater 130 may transmit 1-1 reception strength information, 2-1 reception strength information, 1-2 reception strength information, and 2-2 reception strength information to the device 140 for detecting occupants.

Here, the first communication terminal 20 may receive a signal from one or more beacons located in a space other than the first space 10, because a traveling distance of a beacon signal is about 50 meters at most, and may measure the reception strength information thereof and transmit the same to the first repeater 130.

Figure 4:
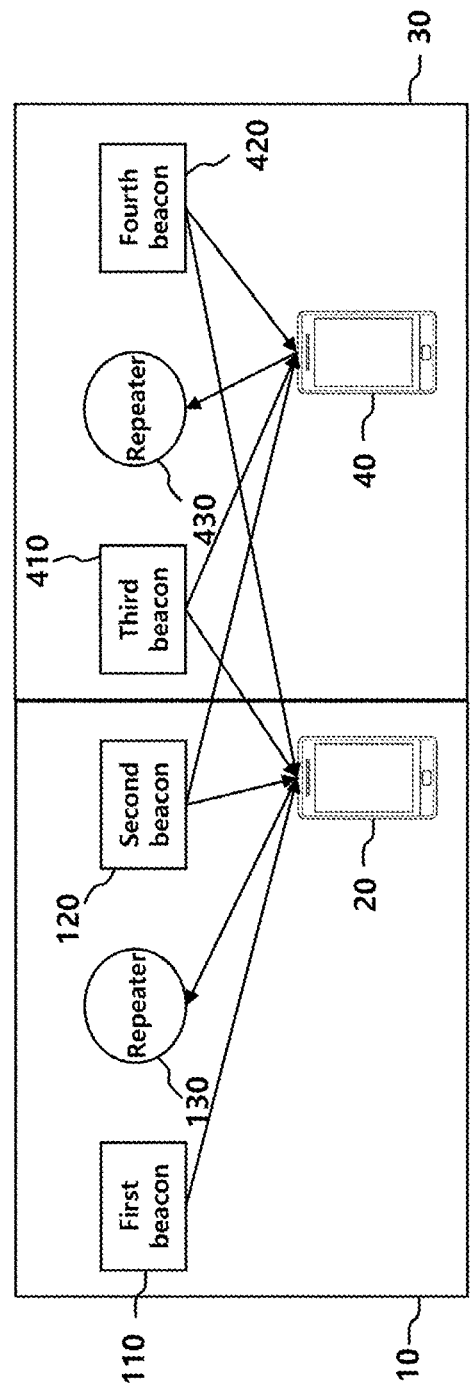

For example, when the first communication terminal 20 is located adjacent to a second space 30 in the first space 10 as shown in FIG. 4, the first communication terminal 20 may also receive a beacon signal from a third beacon 410 and a fourth beacon 420 located in the second space 30, and may transmit the reception strength information thereof, the third beacon ID, and the fourth beacon ID to the first repeater 130. Here, a second communication terminal 40 in the second space 30 may also receive a signal from the beacon located in the first space 10, and may transmit the reception strength information thereof and a beacon ID to a second repeater 430.

The first repeater 130 pre-stores only the first beacon ID and the second beacon ID, and thus may not recognize the third beacon ID and the fourth beacon ID additionally received from the first communication terminal 20.

In this case, the first repeater 130 may not transmit the reception strength information additionally received from the first communication terminal 20 to the device 140 for detecting occupants.

In other words, repeaters installed for each space partitioned by a bulkhead may recognize only beacon IDs corresponding to beacons installed in the same space, transmit only reception strength information on signals of beacons installed in the same space to the device 140 for detecting occupants, and filter reception strength information for other spaces.

The device 140 for detecting occupants may use 1-1 reception strength information, 2-1 reception strength information, 1-2 reception strength information, and 2-2 reception strength information received from the first repeater 130 to estimate whether the first communication terminal 20 is located in the first space 10, and detect occupants in the first space 10 based thereon.

Specifically, the device 140 for detecting occupants may calculate a first vector using 1-1 reception strength information and 2-1 reception strength information, and calculate a second vector using 1-2 reception strength information and 2-2 reception strength information.

In other words, the device 40 for detecting occupants may convert the reception strength information of the beacon signal alternately transmitted from each of the first beacon 110 and the second beacon 120 into a vector amount divided by a signal strength. For example, the first vector may be a vector using reception strength information of each of the 1-1 signal and the 2-1 signal having a high signal strength among the signals transmitted from the first beacon 110 and the second beacon 120, and the second vector may be a vector using reception strength information of each of the 1-2 signal and the 2-3 signal having a low signal strength among the signals transmitted from the first beacon 110 and the second beacon 120.

Here, the device 140 for detecting occupants 140 may receive 1-1 reception strength information, 2-1 reception strength information, 1-2 reception strength information, and 2-2 reception strength information multiple times from the repeater 130 for a preset time period.

The time (Time Window) for the device 140 for detecting occupants to receive 1-1 reception strength information, 2-1 reception strength information, 1-2 reception strength information, and 2-2 reception strength information from the first repeater 130 multiple times may be set to a time (for example, 1 second) in which the occupancy state or directionality for the first communication terminal 20 is not changed while being sufficiently longer than the transmission period in which the first beacon 110 and the second beacon 120 transmit a beacon signal. Here, when an occupant carrying the first communication terminal 20 puts the first communication terminal 20 in a pocket or takes the first communication terminal 20 out of the pocket, the directionality of the first communication terminal 20 may be changed. In addition, even when an occupant carrying the first communication terminal rotates to the right or left in place, the directionality of the first communication terminal 20 may be changed.

The device 140 for detecting occupants may calculate a first vector ($v_1$) using a representative value for a plurality of 1-1 reception strength information ($RSSI_{m(1-1)}$) and a representative value for a plurality of 2-1 reception strength information ($RSSI_{m(2-1)}$) as shown in the following equations. Here, the representative value may mean a median value located in the center when a plurality of values are arranged in an order of magnitude, or may mean a mean value for a plurality of values.

The device 140 for detecting occupants may calculate a second vector ($v_2$) using a representative value for a plurality of 1-2 reception strength information ($RSSI_{m(1-2)}$) and a representative value for a plurality of 2-2 reception strength information ($RSSI_{m(2-2)}$).

In one embodiment, the reason that the device 140 for detecting occupants calculates the vector amount for the reception strength information by using the representative values for the plurality of reception strength information is to increase the accuracy of the position estimation of the first communication terminal 20.

$$v_1 = (RSSI_{m(1-1)}, RSSI_{m(2-1)})$$

$$v_2 = (RSSI_{m(1-2)}, RSSI_{m(2-2)}) \quad \text{[Equation 1]}$$

The device 140 for detecting occupants, which has calculated the first vector $v_1$ and the second vector $v_2$ as above, may calculate cosine similarity of the first vector $v_1$ and the second vector $v_2$ through the following equation.

$$\text{Similarity} = \cos(\theta) = \frac{v_1 \cdot v_2}{|v_1||v_2|} \quad \text{[Equation 2]}$$

Here, $v_1 \cdot v_2$ is an inner product of the first vector $v_1$ and the second vector $v_2$, and $|v_1| |v_2|$ means a scalar multiplication value of the first vector $v_1$ and the second vector $v_2$.

The device 140 for detecting occupants, which has calculated the cosine similarity of the first vector $v_1$ and the second vector $v_2$, may compare the cosine similarity with a preset reference value. Here, the reference value may be a rational number less than or equal to 1 and greater than 0, and the value may be determined through a number of experiments.

When the cosine similarity is greater than or equal to the reference value, the device 140 for detecting occupants may estimate that the first communication terminal 20 is located in the first space 10 as illustrated in FIG. 1.

The reason is that there is no bulkhead that interferes with signal reception inside the first space 10, so the reception strength change pattern for a 1-1 signal and a 2-1 signal having a high signal strength and the reception strength change pattern for a 1-2 signal and a 2-2 signal having a low signal strength may be the same or very similar. Here, the reception strength change pattern may mean a reception strength change rate according to a separation distance between the first beacon 110 and the second beacon 120 and the first communication terminal 20.

After estimating that the first communication terminal 20 is located in the first space 10, the device 140 for detecting occupants may increase a number of existing occupants in the first space 10 by 1.

In other words, the device 140 for detecting occupants may calculate a number of occupants according to the position estimation result of the first communication terminal 20.

For example, when it is estimated that the first communication terminal 20 is located in the first space 10 while an existing number of occupants is 0, the device 140 for detecting occupants may calculate a number of occupants in the first space 10 as 1.

Figure 2:
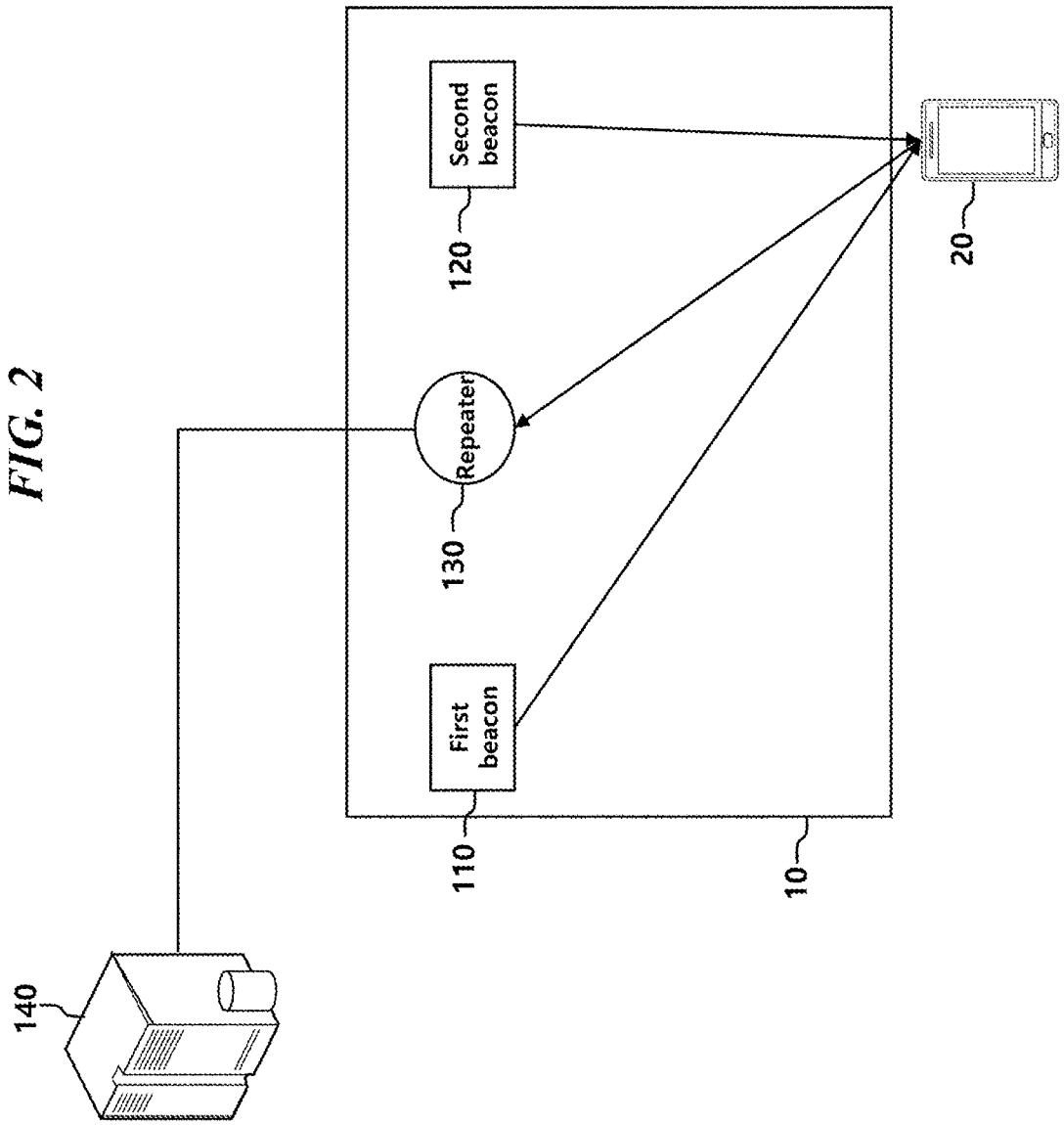
FIGS. 2 to 4 are diagrams for explaining a configuration for detecting occupants in the system for detecting occupants according to one embodiment.

When the cosine similarity is less than the reference value, the device 140 for detecting occupants may estimate that the first communication terminal 20 is located in a space other than the first space 10 as illustrated in FIG. 2.

The reason is that the effect of the bulkhead between the first space 10 and the space other than the first space 10 on the 1-2 signal and the 2-2 signal with a low signal strength is relatively greater than the effect on the 1-1 signal and the 2-1 signal having a high signal strength, and thus the reception strength change pattern for the 1-1 signal and the 2-1 signal may be different from the reception strength change pattern for the 1-2 signal and the 2-2 signal.

After estimating that the first communication terminal 20 is located in a space other than the first space 10, the device 140 for detecting occupants may maintain an existing number of occupants in the first space 10.

For example, when it is estimated that the first communication terminal 20 is located in a space other than the first space 10 in a state where an existing number of occupants is 3, the device 140 for detecting occupants may maintain a number of occupants in the first space 10 as 3.

When a plurality of Wi-Fi signals exist in the first space 10 or the weather is cloudy, the signals of the first beacon 110 and the second beacon 120 may become unstable.

When the signals of the first beacon 110 and the second beacon 120 become unstable, the detection accuracy of the device 140 for detecting occupants may decrease.

The device 140 for detecting occupants may perform a process of calculating cosine similarity of the first vector $v_1$ and the second vector $v_2$ multiple times in order to increase detection accuracy. In addition, the device 140 for detecting occupants may compare a plurality of cosine similarities with a reference value.

When a number of cosine similarities greater than or equal to the reference value among the plurality of cosine similarities is greater than or equal to a certain number, the device 140 for detecting occupants may estimate that the first communication terminal 20 is located in the first space 10.

When a number of cosine similarities less than or equal to the reference value among the plurality of cosine similarities is greater than or equal to a certain number, the device 140 for detecting occupants may estimate that the first communication terminal 20 is located in a space other than the first space 10.

Figure 3:
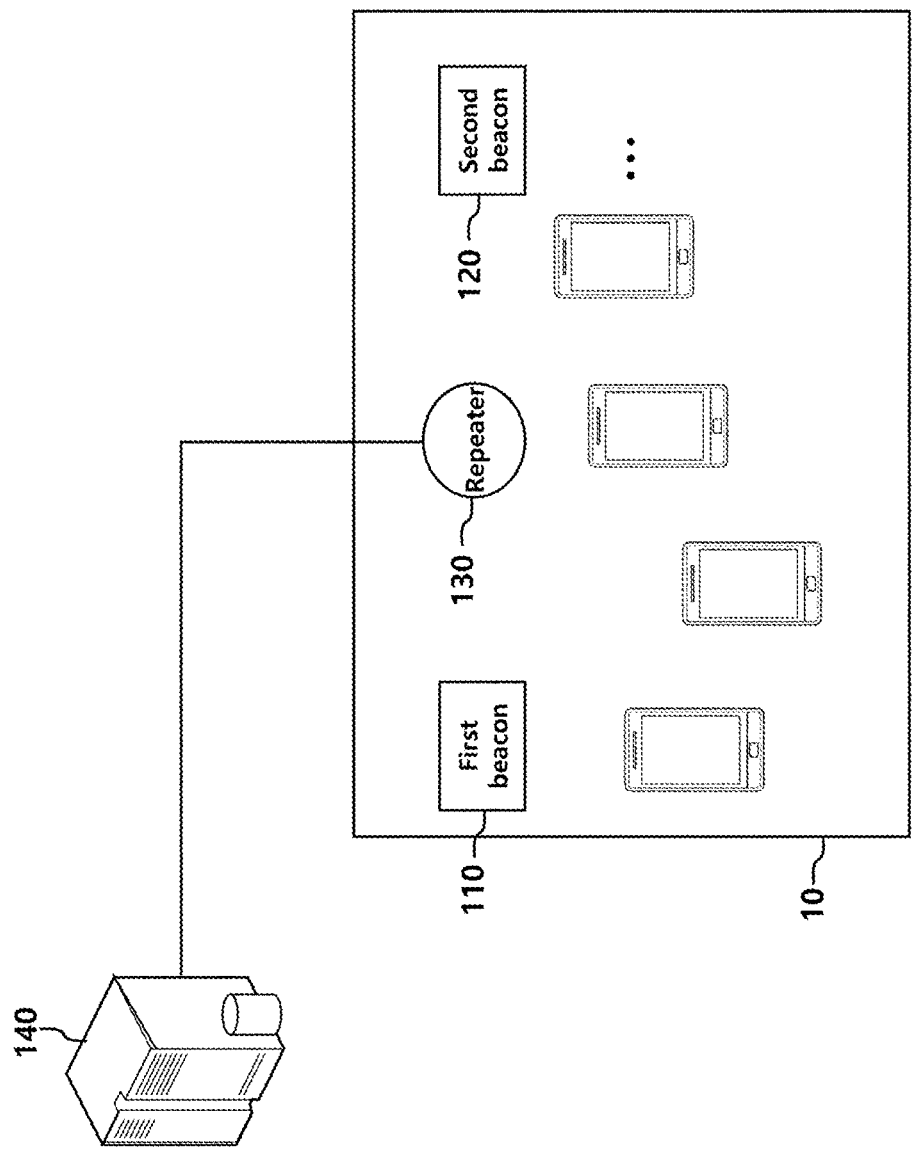

The device 140 for detecting occupants periodically estimates the location for each of a plurality of communication terminals located in the first space 10 as illustrated in FIG. 3 through the above configuration, and periodically calculates a number of occupants based on the estimated location.

The device 140 for detecting occupants may adjust one or more of a wind speed, a wind direction, a temperature condition, and a humidity condition of an air conditioning device installed in the first space 10 according to the calculated number of occupants.

In addition, the device 140 for detecting occupants may adjust illuminance of a lighting device installed in the first space 10 according to the number of occupants.

In one embodiment, when the first space 10 is a large area that may be divided into a plurality of zones, and an air conditioning device and a lighting device are installed for each of a plurality of zones, or when it is possible to control the air conditioning device and the lighting device for a plurality of zones, the device 140 for detecting occupants may calculate a number of occupants in the first space 10 by a plurality of zones through the additional configuration as follows, and control an air conditioning device, a lighting device, etc. according to the number of occupants for each of the plurality of zones.

First, the device 140 for detecting occupants multiplies a representative value for a plurality of 1-1 reception strength information ($RSSI_{m(1-1)}$) and a representative value for a plurality of 1-2 reception strength information ($RSSI_{m(1-2)}$) to calculate a first multiplication value $mv_1$, and multiplies a representative value for a plurality of 2-1 reception strength information ($RSSI_{m(2-1)}$) and a representative value for a plurality of 2-2 reception strength information ($RSSI_{m(2-2)}$) to calculate a second multiplication value $mv_2$ as shown in the following equations.

In addition, the device 140 for detecting occupants compares the first multiplication value $mv_1$ and the second multiplication value $mv_2$ to calculate a difference value between the first multiplication value and the second multiplication value.

When the first multiplication value is greater than the second multiplication value and the difference value is greater than or equal to a certain standard, the device 140 for detecting occupants may estimate that the first communication terminal 20 is adjacent to the first beacon 110. In this case, the device 140 for detecting occupants may increase a number of occupants in the vicinity of the first beacon 110, that is, in the zone where the first beacon 110 is located, by 1.

When the second multiplication value is greater than the first multiplication value and the difference value is greater than or equal to a certain standard, the device 140 for detecting occupants may estimate that the first communication terminal 20 is adjacent to the second beacon 120, and increase a number of occupants in the zone where the second beacon 120 is located by 1.

Here, when the difference value between the first multiplication value and the second multiplication value is less than a certain standard, the device 140 for detecting occupants may not perform the configuration of calculating a number of occupants for each of a plurality of zones.

$$mv_1 = RSSI_{m(1-1)} \times RSSI_{m(1-2)}$$

$$mv_2 = RSSI_{m(2-1)} \times RSSI_{m(2-2)} \quad \text{[Equation 3]}$$

As above, the device 140 for detecting occupants, which has calculated the number of occupants for each zone in the first space 10, may differently control an air conditioning device, a lighting device, etc. for each zone according to the number of occupants for each zone.

In other words, the device 140 for detecting occupants may adjust one or more of a wind speed, a wind direction, a temperature condition, and a humidity condition of an air conditioning device installed adjacent to the first beacon 110 or the second beacon 120 in the first space according to the number of occupants adjacent to the first beacon 110 or the second beacon 120.

In addition, the device 140 for detecting occupants may adjust illuminance of a lighting device installed adjacent to the first beacon 110 or the second beacon 120 in the first space according to the number of occupants adjacent to the first beacon 110 or the second beacon 120.

The device 140 for detecting occupants as described above may be a control device of a Building Energy Management System (BEMS).

Hereinafter, a process of detecting occupants in the system 100 for detecting occupants will be described.

Figure 5:
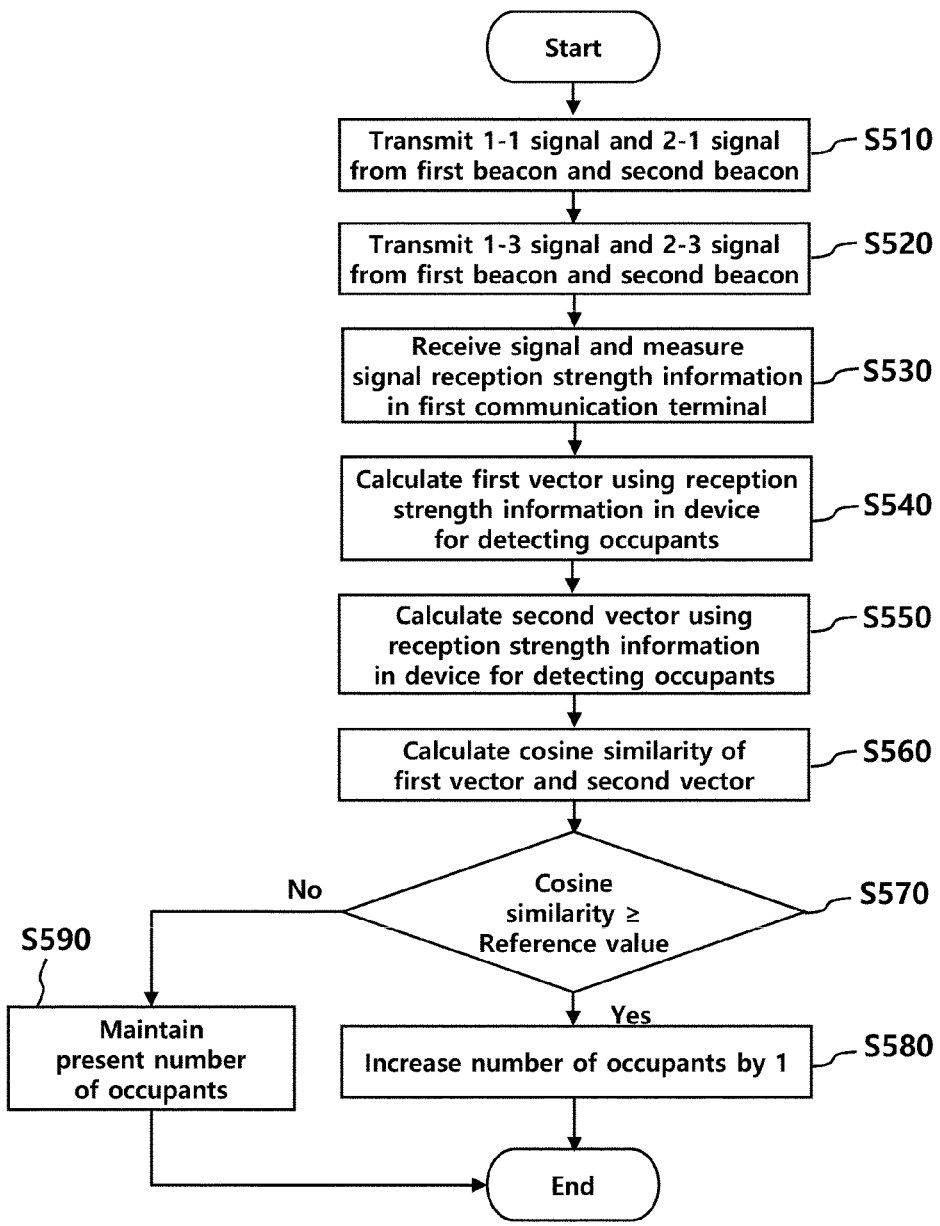
FIG. 5 is a flowchart illustrating a process of detecting occupants in the system for detecting occupants according to one embodiment.

FIG. 5 is a flowchart illustrating a process of detecting occupants in the system for detecting occupants according to one embodiment.

Referring to FIG. 5, the first beacon 110 transmits the 1-1 signal at the first transmission strength, and the second beacon 120 also transmits the 2-1 signal at the first transmission strength (S510).

Thereafter, the first beacon 110 transmits the 1-2 signal at the second transmission strength, and the second beacon 120 also transmits the 2-2 signal at the second transmission strength (S520). Here, the first beacon 110 and the second beacon 120 may transmit signals in a broadcast manner.

The first communication terminal 20 located within a signal traveling distance of the first beacon 110 and the second beacon 120 may receive the signals transmitted in operations S510 and S520, and may measure the 1-1 reception strength information, the 2-1 reception strength information, the 1-2 reception strength information, and the 2-2 reception strength information, which are reception strength information of the signals (S530).

The device 140 for detecting occupants may calculate a first vector using the 1-1 reception strength information and the 2-1 reception strength information corresponding to the first transmission strength among the reception strength information measured by the first communication terminal 20 (S540).

In addition, the device 140 for detecting occupants may calculate a second vector using the 1-2 reception strength information and the 2-2 reception strength information corresponding to the second transmission strength (S550). Here, the device 140 for detecting occupants may calculate a median value for the reception strength information stored before operation S510 and the reception strength information for each of operations S540 and S550, and use the median value to calculate the first vector and the second vector. In other words, the device 140 for detecting occupants may collect reception strength information for a preset time, and calculate the first vector and the second vector based on the representative values. Here, the time (Time Window) for collecting the reception strength information may be set to a time (for example, 1 second) in which the occupancy state or directionality for the first communication terminal 20 is not changed while sufficiently longer than the transmission period in which the first beacon 110 and the second beacon 120 transmit a beacon signal.

The device 140 for detecting occupants may calculate cosine similarity of the first vector and the second vector, and compare the cosine similarity with a preset reference value (S560 and S570).

When the cosine similarity is greater than or equal to the reference value in operation S560, the device 140 for detecting occupants may estimate that the first communication terminal 20 is located in the first space 10, and based thereon, increase a number of occupants in the first space 10 by 1 (S580).

When the cosine similarity is less than the reference value in operation S560, the device 140 for detecting occupants may estimate that the first communication terminal 20 is located in a space other than the first space 10, and based thereon, maintain a number of occupants in the first space 10 as an existing number of occupants (S590).

After operation S570 or after operation S580, the device 140 for detecting occupants may adjust one or more of a wind speed, a wind direction, a temperature condition, and a humidity condition of an air conditioning device installed in the first space 10 according to the number of occupants in the first space 10, or may adjust illuminance of a lighting device installed in the first space 10.

The device 140 for detecting occupants may calculate a plurality of cosine similarities by repeating the steps S510 to S560 multiple times.

In addition, the device 140 for detecting occupants may compare a plurality of cosine similarities with a reference value, respectively. When a number of cosine similarities greater than or equal to the reference value among the plurality of cosine similarities is equal to or greater than a certain number, the device 140 for detecting occupants may estimate that the first communication terminal 20 is located in the first space 10.

When a number of cosine similarities less than or equal to the reference value among the plurality of cosine similarities is greater than or equal to a certain number, the device 140 for detecting occupants may estimate that the first communication terminal 20 is located in a space other than the first space 10.

As described above, since the system 100 for detecting occupants according to one embodiment calculates vectors for each signal strength for beacon signals having different signal strengths and detects a number of occupants according to the cosine similarity between the vectors, it is possible to improve the accuracy of occupant detection compared to the conventional method of detecting a number of occupants using only the signal strength of the beacon signal.

From the foregoing, the configuration in which the system 100 for detecting occupants includes a repeater has been described.

Hereinafter, a system for detecting occupants that does not include a repeater will be described.

Figure 6:
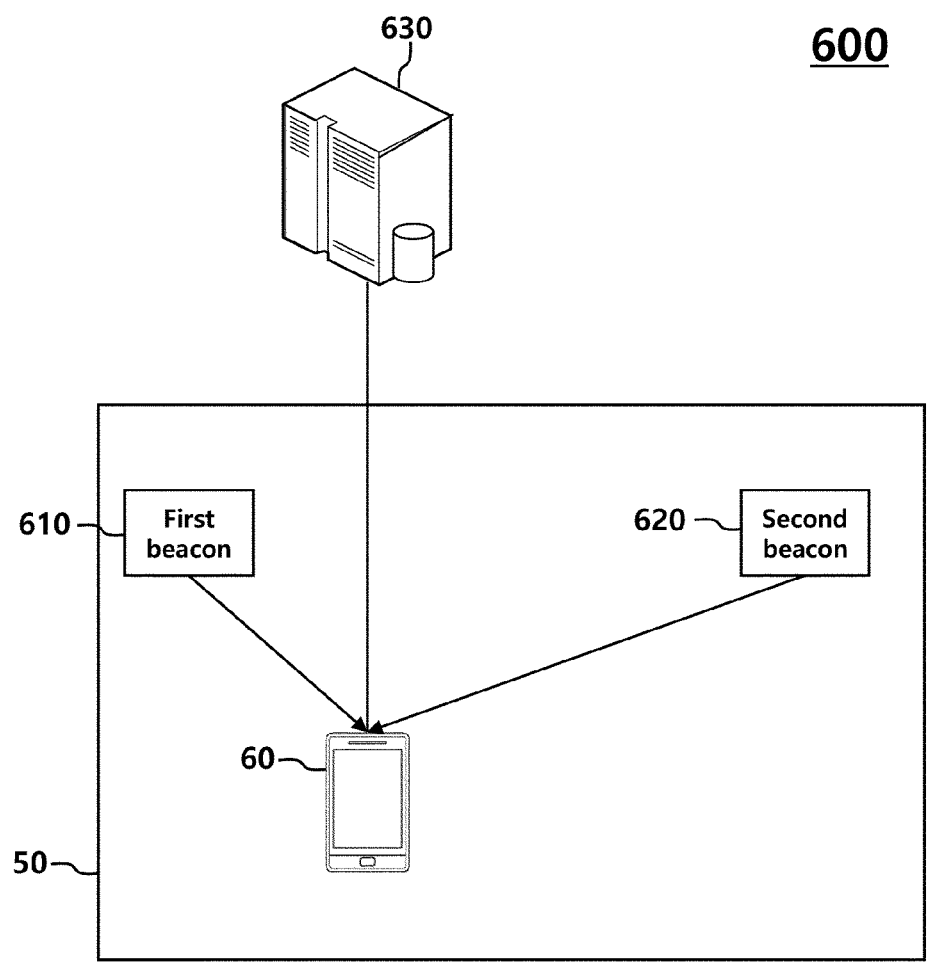
FIG. 6 is a diagram of a system for detecting occupants according to another embodiment.

FIG. 6 is a diagram of a system for detecting occupants according to another embodiment.

Referring to FIG. 6, the system 600 for detecting occupants may include a first beacon 610, a second beacon 620, and a device 630 for detecting occupants.

In another embodiment, the first beacon 610 and the second beacon 620 may be installed in a third space 50 without a repeater. Here, the third space 50 may be a work space, a lecture space, a residential space, and the like.

Since the configuration of the first beacon 610 and the second beacon 620 is the same as that of the first beacon 110 and the second beacon 120 in one embodiment, in another embodiment, a description of the configuration of the first beacon 610 and the second beacon 620 will be omitted.

In another embodiment, a third communication terminal 60 may be a mobile communication terminal located within a signal traveling distance of the first beacon 610 and the second beacon 620. A dedicated application program for performing communication with a beacon and the device 630 for detecting occupants may be installed in the third communication terminal 60.

Thus, the third communication terminal 60 may receive a 1-1 signal from the first beacon 610 and receive a 2-1 signal from the second beacon 620. In addition, the reception strength of the 1-1 signal and the reception strength of the 2-1 signal may be measured.

Thereafter, the third communication terminal 60 may receive a 1-2 signal from the first beacon 610 and receive a 2-2 signal from the second beacon 620. In addition, the reception strength of the 1-2 signal and the reception strength of the 2-2 signal may be measured.

As described above, the third communication terminal 60 measuring the reception strength of the received signals may transmit the reception strength information of the received signals to the device 630 for detecting occupants through communication with the device 630 for detecting occupants. In other words, the third communication terminal 60 may transmit 1-1 reception strength information, 1-2 reception strength information, 2-1 reception strength information, and 2-1 reception strength information, which are the reception strength information of a 1-1 signal, a 1-2 signal, a 2-1 signal, and a 2-2 signal, to the device 630 for detecting occupants.

Here, the third communication terminal 60 may transmit 1-1 reception strength information and 2-1 reception strength information to the device 630 for detecting occupants, and then transmit 1-2 reception strength information and 2-2 reception strength information to the device 630 for detecting occupants through wireless Internet communication including Wi-Fi communication and mobile communication.

In addition, the third communication terminal 60 may transmit 1-1 reception strength information, 2-1 reception strength information, 1-2 reception strength information, and 2-2 reception strength information in batches to the device 630 for detecting occupants.

When transmitting the reception strength information to the device 630 for detecting occupants, the third communication terminal 60 may also transmit the first beacon ID and the second beacon ID.

While the third communication terminal 60 is located within a signal traveling distance of the first beacon 610 and the second beacon 620, the above operation may be periodically repeated.

The device 630 for detecting occupants may receive 1-1 reception strength information, 2-1 reception strength information, 1-2 reception strength information, and 2-2 reception strength information through communication with the third communication terminal 60, and may also receive the first beacon ID and the second beacon ID.

The device 630 for detecting occupants may pre-store the first beacon ID and the second beacon ID. In addition, the first beacon ID and the second beacon ID may be recognized by comparing the pre-stored first beacon ID and the second beacon ID with the first beacon ID and the second beacon ID received from the third communication terminal 60. Thus, the device 630 for detecting occupants may identify that the reception strength information received together with the first beacon ID and the second beacon ID is reception strength information for the signals of the first beacon 610 and the second beacon 620 installed in the third space 50.

The third communication terminal 60 may receive a signal from one or more beacons located in a space other than the third space 50, because a traveling distance of a beacon signal is about 50 meters at most, and the reception strength information therefor may be transmitted to the device 630 for detecting occupants. Here, the third communication terminal 60 may further receive a beacon ID from one or more beacons located in another space, and may further transmit one or more beacon IDs when transmitting the reception strength information to the device 630 for detecting occupants.

When the device 630 for detecting occupants detects occupants in the third space 50, reception strength information for signals in another space may be unnecessary.

The device 630 for detecting occupants may store beacon IDs classified for each space in a building, check the received beacon IDs along with the reception strength information, and filter the reception strength information corresponding to beacon IDs other than the first beacon ID and the second beacon ID.

In addition, the device 630 for detecting occupants may filter the reception strength information of which reception strength is less than or equal to a certain standard among reception strength information received from the third communication terminal 60.

In other words, since the reception strength of the signal passing through a bulkhead of the third space 50 in another space is lower than a certain standard, the device 630 for detecting occupants may filter the reception strength information of which reception strength is less than or equal to a certain standard among reception strength information received from the third communication terminal 60.

In addition, the device 630 for detecting occupants may calculate cosine similarity for the beacons (a first beacon and a second beacon) in the third space 50 multiple times by using the reception strength information received from the third communication terminal 60, and calculate one or more cosine similarities for the beacons (a first beacon or a second beacon) in the third space 50 and beacons in another space or cosine similarities for the beacons in another space.

Here, since it is rare for a beacon signal in another space to pass through the bulkhead in the third space 50, the number of cosine similarities for the beacons (a first beacon or a second beacon) in the third space 50 and beacons in another space may be smaller than the number of cosine similarities for the beacons (a first beacon and a second beacon) in the third space 50. The number of cosine similarities for the beacons in another space may also be smaller than the number of cosine similarities for the beacons (a first beacon and a second beacon) in the third space 50. Accordingly, the device 630 for detecting occupants may detect occupants in the third space 50 using only the cosine similarity calculated the most.

In another embodiment, a configuration in which the device 630 for detecting occupants detects occupants in the third space 50 using the 1-1 reception strength information, the 2-1 reception strength information, the 1-2 reception strength information, and the 2-2 reception strength information is identical to a configuration in which the device 140 for detecting occupants in one embodiment detects occupants in the first space 10. Accordingly, in another embodiment, a description of the configuration for detecting occupants in the third space 50 will be omitted.

The term "comprises," "includes," or "has" described above should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted as coinciding with meanings of the related art from the context. It will be understood that terms should not be interpreted in an idealized or overly formal sense unless expressly so defined herein.

Hereinbefore, although the technical ideas of the present disclosure have been disclosed for illustrative purposes, a person having ordinary skill in the art to which the present disclosure pertains will appreciate that various modifications and variations are possible, without departing from the spirit and essential characteristics of the present disclosure. Therefore, the embodiments of the present disclosure are disclosed only for illustrative purposes and should not be construed as limiting the technical ideas of the present disclosure. The scope of protection of the present disclosure should be determined on the basis of the descriptions in the appended claims, and all technical ideas within the scope of equivalents thereof should be construed as being included in the scope of right of the present disclosure.

What is claimed is:

1. A system for detecting occupants, the system comprising:
    a first beacon, which is installed in a first space partitioned by a bulkhead in a building, and configured to transmit a 1-1 signal at a first transmission strength and then transmit a 1-2 signal at a second transmission strength;
    a second beacon, which is installed to be spaced apart from the first beacon by a predetermined distance in the first space, and configured to transmit a 2-1 signal at the first transmission strength and then transmit a 2-2 signal at the second transmission strength;
    a repeater configured to receive and transmit 1-1 reception strength information of the 1-1 signal, 1-2 reception strength information of the 1-2 signal, 2-1 reception strength information of the 2-1 signal, and 2-2 reception strength information of the 2-2 signal received from a communication terminal receiving signals transmitted from the first beacon and the second beacon; and
    a device for detecting occupants configured to estimate whether the communication terminal is located in the first space, and detect a number of occupants in the first space, by comparing cosine similarity for a first vector, calculated by using the 1-1 reception strength information and the 2-1 reception strength information received from the repeater, and a second vector, calculated by using the 1-2 reception strength information and the 2-2 reception strength information received from the repeater, with a preset reference value,
    wherein the device for detecting occupants is further configured to increase the number of occupants in the first space by 1 after estimating that the communication terminal is located in the first space when the cosine similarity is equal to or greater than the preset reference value, and
    wherein the device for detecting occupants is further configured to adjust at least one condition among a wind speed, a wind direction, a temperature, and a humidity of an air conditioning device installed in the first space according to the number of occupants in the first space.

2. The system of claim 1, wherein, after receiving the 1-1 reception strength information, the 2-1 reception strength information, the 1-2 reception strength information, and the 2-2 reception strength information multiple times for a preset time, the device for detecting occupants is further configured to calculate the first vector by using a representative value for multiple pieces of 1-1 reception strength information and a representative value for multiple pieces of 2-1 reception strength information and calculate the second vector by using a representative value for multiple pieces of 1-2 reception strength information and a representative value for multiple pieces of 2-2 reception strength information.

3. The system of claim 2, wherein the device for detecting occupants is further configured to estimate that the communication terminal is located in the first space when the cosine similarity is equal to or greater than the preset reference value, and then, compare a first multiplication value calculated by multiplying the representative value for the multiple pieces of 1-1 reception strength information and the representative value for the multiple pieces of 1-2 reception strength information with a second multiplication value calculated by multiplying the representative value for the multiple pieces of 2-1 reception strength information and the representative value for the multiple pieces of 2-2 reception strength information to estimate a beacon adjacent to the communication terminal.

4. The system of claim 3, wherein, when the first multiplication value is greater than the second multiplication value and a difference between the two values is equal to or greater than a predetermined reference, the device for detecting occupants is further configured to estimate that the communication terminal is adjacent to the first beacon, and then, increase a number of occupants in the vicinity of the first beacon in the first space by 1.

5. The system of claim 4, wherein the device for detecting occupants is further configured to adjust at least one condition among a wind speed, a wind direction, a temperature, and a humidity of an air conditioning device installed in the vicinity of the first beacon in the first space according to the number of occupants in the vicinity of the first beacon.

6. The system of claim 4, wherein the device for detecting occupants is further configured to adjust illuminance of a lighting device installed in the vicinity of the first beacon in the first space according to the number of occupants in the vicinity of the first beacon.

7. The system of claim 1, wherein the device for detecting occupants is further configured to maintain the number of occupants in the first space as an existing number of occupants after estimating that the communication terminal is located in a space other than the first space when the cosine similarity is less than the preset reference value.

8. A method for detecting occupants in a system for detecting occupants, the system including a first beacon, a second beacon, and a device for detecting occupants, wherein the method comprises:
    a first transmission operation of transmitting a 1-1 signal and a 2-1 signal, having a first transmission strength, respectively from the first beacon and the second beacon, which are installed in a first space partitioned by a bulkhead in a building;
    a second transmission operation of transmitting a 1-2 signal and a 2-2 signal, having a second transmission strength, respectively from the first beacon and the second beacon;
    a vector calculation operation in which, when 1-1 reception strength information for the 1-1 signal, 1-2 reception strength information for the 1-2 signal, 2-1 reception strength information for the 2-1 signal, and 2-2 reception strength information for the 2-2 signal are measured in a communication terminal receiving signals from the first beacon and the second beacon, the device for detecting occupants calculates a first vector using the 1-1 reception strength information and the 2-1 reception strength information corresponding to the first transmission strength and calculates a second vector using the 1-2 reception strength information and the 2-2 reception strength information corresponding to the second transmission strength; and an occupant detection operation in which the device for detecting occupants estimates whether the communication terminal is located in the first space and detects a number of occupants in the first space by comparing cosine similarity for the first vector and the second vector with a preset reference value, wherein, in the occupant detection operation, the device for detecting occupants increases the number of occupants in the first space by 1 when the cosine similarity is greater than or equal to the reference value, and wherein, after the occupant detection operation, the method further comprises an air conditioning control operation in which the device for detecting occupants adjusts at least one condition among a wind speed, a wind direction, a temperature, and a humidity of an air conditioning device installed in the first space according to the number of occupants in the first space.

9. The method of claim 8, wherein, in the vector calculation operation, the system for detecting occupants further comprises a repeater installed in the first space, the repeater receiving the 1-1 reception strength information, the 1-2 reception strength information, the 2-1 reception strength information, and the 2-2 reception strength information from the communication terminal and transmitting the same to the device for detecting occupants.

10. The method of claim 8, after the occupant detection operation, further comprising a lighting control operation in which the device for detecting occupants adjusts illuminance of a lighting device installed in the first space according to the number of occupants in the first space.

11. A system for detecting occupants, comprising:

a first beacon, which is installed in a first space partitioned by a bulkhead in a building, and configured to transmit a 1-1 signal at a first transmission strength, and then, transmit a 1-2 signal at a second transmission strength;

a second beacon, which is installed to be spaced apart from the first beacon by a predetermined distance in the first space, and configured to transmit a 2-1 signal at the first transmission strength, and then, transmit a 2-2 signal at the second transmission strength; and a device for detecting occupants configured to receive 1-1 reception strength information of the 1-1 signal, 1-2 reception strength information of the 1-2 signal, 2-1 reception strength information of the 2-1 signal, and 2-2 reception strength information of the 2-2 signal from a communication terminal receiving signals transmitted from the first beacon and the second beacon, estimate whether the communication terminal is located in the first space and detect a number of occupants in the first space, by comparing cosine similarity for a first vector, calculated by using the 1-1 reception strength information and the 2-1 reception strength information, and a second vector, calculated by using the 1-2 reception strength information and the 2-2 reception strength information, with a preset reference value, wherein the device for detecting occupants is further configured to increase the number of occupants in the first space by 1 after estimating that the communication terminal is located in the first space when the cosine similarity is equal to or greater than the preset reference value, and wherein the device for detecting occupants is further configured to adjust at least one condition among a wind speed, a wind direction, a temperature, and a humidity of an air conditioning device installed in the first space according to the number of occupants in the first space.

\* \* \* \* \*